DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 3, 1974

929 O.G. 10

T929,005

POLYETHYLENE TEREPHTHALATE FILM MASKING MATERIAL

Conrad Erve Miller, Circleville, Ohio, assignor to E. I. du Pont de Nemours and Company, Wilmington, Del.

Continuation of abandoned application Ser. No. 333,523, Feb. 20, 1973. This application Nov. 19, 1973, Ser. No. 417,298

Int. Cl. C08g *51/04*

U.S. Cl. 260—40 R

No Drawing. 13 Pages Specification

Biaxially oriented, heat-set, polyethylene terephthalate film from about 2.5 to 4.0 mils thick and containing from about 1.5 to 4 percent titanium dioxide, from about 1 to 2 percent silica and colored pigments selected from oarnge to red, such film having desired optical and surface properties rendering it suitable for use as a masking material.